United States Patent
Choochotkaew et al.

(10) Patent No.: US 11,711,339 B1
(45) Date of Patent: Jul. 25, 2023

(54) NETWORK PLUGIN FOR MULTIPLE NETWORK INTERFACES

(71) Applicant: INTERNATIONAL BUSINESS MACHINES CORPORATION, Armonk, NY (US)

(72) Inventors: Sunyanan Choochotkaew, Koto (JP); Tatsuhiro Chiba, Bunkyo-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/808,167

(22) Filed: Jun. 22, 2022

(51) Int. Cl.
| | | |
|---|---|---|
| *H04L 29/06* | (2006.01) | |
| *G06F 9/50* | (2006.01) | |
| *H04L 12/26* | (2006.01) | |
| *H04L 61/5007* | (2022.01) | |
| *H04L 61/5061* | (2022.01) | |
| *H04L 41/0893* | (2022.01) | |
| *H04L 45/02* | (2022.01) | |
| *H04L 41/12* | (2022.01) | |
| *H04L 101/668* | (2022.01) | |

(52) U.S. Cl.
CPC ...... *H04L 61/5007* (2022.05); *H04L 41/0893* (2013.01); *H04L 41/12* (2013.01); *H04L 45/04* (2013.01); *H04L 61/5061* (2022.05); *H04L 2101/668* (2022.05)

(58) Field of Classification Search
CPC ............. H04L 61/5007; H04L 61/5061; H04L 41/0893; H04L 41/12; H04L 45/085
See application file for complete search history.

(56) References Cited

U.S. PATENT DOCUMENTS

| | | | | |
|---|---|---|---|---|
| 11,277,309 | B2 * | 3/2022 | Vaidya | H04L 41/0806 |
| 11,316,822 | B1 * | 4/2022 | Gawade | H04L 61/5084 |
| 2020/0044966 | A1 * | 2/2020 | Krishnan | H04L 61/5007 |
| 2021/0144090 | A1 | 5/2021 | Zhang | |
| 2022/0014459 | A1 * | 1/2022 | Ganguli | H04L 67/289 |
| 2022/0038501 | A1 * | 2/2022 | Shen | G06F 9/5077 |
| 2022/0116323 | A1 * | 4/2022 | Tracy | H04L 45/566 |

OTHER PUBLICATIONS

Anonymous. "Configure multiple network interfaces for pods." Printed Dec. 23, 2021. 12 pages. Published by Google. https://cloud.google.com/anthos/clusters/docs/bare-metal/1.8/how-to/multi-nic.
Anonymous. "Configuring an ipvlan network." Printed Feb. 23, 2022. 12 pages. Published by RedHat. https://docs.openshift.com/container-platform/4.5/networking/multiple_networks/configuring-ipvlan.html.
Anonymous. "Determine best networking option." Printed Dec. 23, 2021. 10 pages. Published by Project Calico. https://projectcalico.docs.tigera.io/networking/determine-best-networking.
Joshi, et al., "Amazon EKS now supports Multus CNI." Published Aug. 2, 2021 by Amazon. 13 pages. https://aws.amazon.com/blogs/containers/amazon-eks-now-supports-multus-cni/.

* cited by examiner

*Primary Examiner* — Christopher B Robinson
(74) *Attorney, Agent, or Firm* — Grant M. McNeilly

(57) ABSTRACT

A new host is detected being added to a network cluster, wherein each of a plurality of hosts are on the network cluster. Available interfaces on each of the plurality of hosts on the network cluster are detected responsive to detecting the new host being added. A classless inter-domain routing (CIDR) range is calculated for hosts and interfaces on the network cluster using the available interfaces. Pod routes with interface range and L3 host routes are set for each host.

7 Claims, 3 Drawing Sheets

NETWORK PLUGIN FOR MULTIPLE NETWORK INTERFACES

BACKGROUND

Container networking, hereinafter interchangeably referred to as pod networking, is a form of virtualization where applications are handled as discrete items, where these items are referred to as containers or pods. These containers/pods are similar to virtual machines in some ways, where these pods are largely used in situations where they can be used to run large applications in a distributed manner.

SUMMARY

Aspects of the present disclosure relate to a method, system, and computer program product relating to a network plugin for multiple network interfaces with automated L3 configuration. For example, the method includes detecting a new host being added to a network cluster, wherein each of a plurality of hosts are on the network cluster. The method also includes detecting available interfaces on each of the plurality of hosts on the network cluster responsive to detecting the new host being added. The method also includes calculating, using the available interfaces, classless inter-domain routing (CIDR) range for hosts and interfaces on the network cluster. The method also includes setting pod routes with interface range and L3 host routes for each host. A system and computer program configured to execute the method described above are also described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
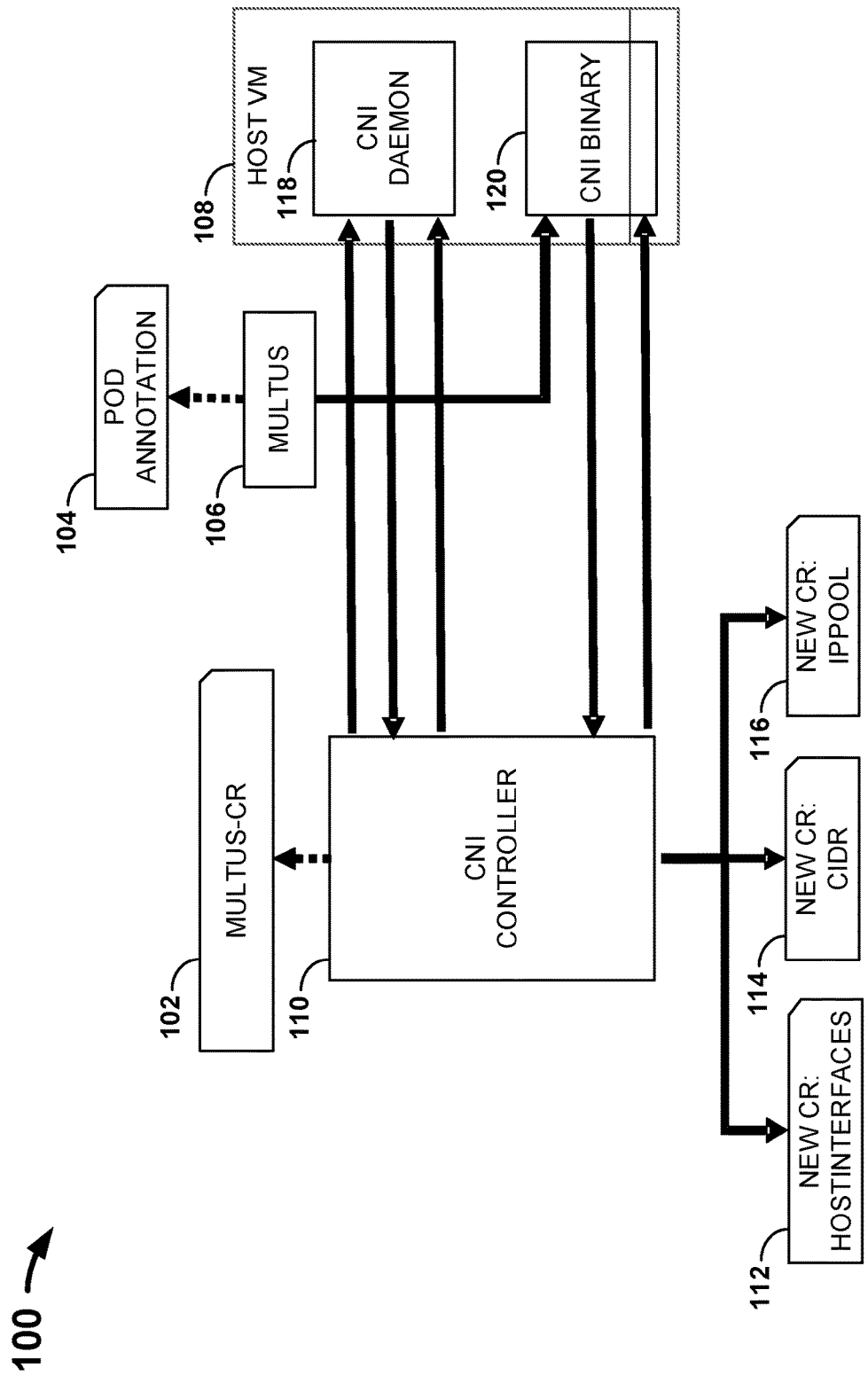
FIG. 1 depicts a conceptual data flowchart of a container network interface management system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to container networking, while more particular aspects of the present disclosure relate to a network plugin for multiple network interfaces with automated L3 configuration. While the present disclosure is not necessarily limited to such applications, various aspects of the disclosure may be appreciated through a discussion of various examples using this context.

Container networking, hereinafter interchangeably referred to as pod networking (e.g., where "containers" are interchangeably referred to as "pods"), is an increasingly common technique. When pod networking is used, there are a few ways to get pods to communicate with each other, such as enabling communication between the pods via tunnelling (e.g., encapsulation). This is common, but often requires high overhead, perhaps cutting potential bandwidth in half (if not an even greater loss of bandwidth). Alternatively, MacVLAN and IPvlan are drivers that can be used to expose container packets to underlaying host networks using the pod internet protocol (IP) without encapsulation. However, using drivers such as MacVLAN and IPvlan requires that packets be later routed by L2 or L3 network layers. Packets on L2 network layers can dynamically be routed by address resolution protocol (ARP) traffic, but virtualized environments, or virtual private clouds (VPCs) typically do not support/allow L2 traffic. Similarly, within conventional systems L3 traffic is not dynamically routable, but rather it requires explicit neighbor entries to be known/static.

Another common technique in this realm is the use of multiple network interface cards (NICs). High-performing computing (HPC) applications and/or artificial intelligence (AI) applications use multiple NICs to increase performance by spreading the execution of high-demand jobs across a significant number of computing nodes on a massive scale. Many conventional cloud computing offerings support multiple NICs for virtual machine (VM) instances in their VPC using a network plugin like Multus. However, it can become cumbersome to handle cluster-wide IP address management (IPAM) for a single network. For example, conflicts of subnets between multiple NICs must be manually analyzed and solved in conventional systems. For another example, IPAM produces per-pod, per-interface, per-host L3 routes on each host route table, such that L3 routes must be updated on all worker nodes every time a new pod is created and/or deleted (e.g., given that L3 communication is not dynamic as discussed above). As such, when any given worker node joins and/or leaves a cluster, all L3 routes need to be analyzed/updated accordingly.

Therefore, as would be understood by one of ordinary skill in the art, conventional interface-creation plugins rely on fixed interface names, where these names are often different on different hosts for a single network, especially in VPC environments. Accordingly, pod annotations are often limited to pre-scheduled hosts, even when cluster-wide IPAM is utilized, hampering intra-cluster communication efforts.

Aspects of this disclosure improve or address technical shortcomings of conventional systems in enabling networking interface autodetection and dynamic configuration. For example, aspects of this disclosure relate to a network plugin for multiple network interfaces with automatic L3 configuration. One or more computing devices that include or otherwise utilize one or more processing units executing instructions stored on one or more memories may provide the functionality that addresses these problems, where said computing device(s) are herein referred to as a controller.

For example, the controller may enable networking interface autodetection by automatically detecting available interfaces on each host whenever a new host is added to a networking cluster. The controller may use network address as a key to identify the subnet, and therein set a subnet index for the network. The controller may then automatically determine the non-conflict classless inter-domain routing (CIDR) range of each host and of each interface once the plugin definition is defined. The controller may determine the CIDR range using user-defined factors, such as global subnet, master network addresses, nodeBlock, interfaceBlock, or the like. The controller may then automatically set pod routes that are within the determined interface range and set L3 host routes (next hop via dev) at each host. From here, the next time that the plugin is called at pod creation, the controller may automatically create directly-IP-exposing interfaces (e.g., IPVLAN) and assign available IPs for each interface from the computed CIDR range of corresponding host. At this point the controller may repeat these steps as necessary each time that a new host is added. Further, when a pod is deleted from the cluster, the controller may detect such deletion and recycle the IP address of the deleted pod. Similarly, the controller may be configured to detect when a host is removed from a cluster and recycle/update the host index to reflect this removal.

In this way, aspects of this disclosure may dynamically detect changes on hosts and interfaces and determine non-conflict IP address range (CIDR) for multiple hosts and multiple interfaces by inputting a single global subnet, list of network addresses, interface block size (bits) and host block size (bits), to therein integrate IPAM-computed CIDR data for dynamically configuring L3 routes on host table to route pod packets across different hosts without network address translations (NATs) and overlay networks. Therefore, as would be understood by one of ordinary skill in the art, aspects of this disclosure may improve functionality of container networking while reducing overhead.

For example, FIG. 1 depicts an example CNI data flowchart 100 whereby aspects of this disclosure may automatically and dynamically detect changes of hosts and interfaces and update network settings accordingly. As depicted in FIG. 1, orchestrator storage can be used to keep data synchronized by defining new custom resources, where in FIG. 1 these new custom resources include host interface data 112, CIDR computation data 114, and IP assignment data 116. Data flowchart 100 is in a depicted system with a CNI controller 110 (IPAM service), CNI daemon 118, and a CNI binary 120 (e.g., where both the CNI daemon and CNI binary 120 are on a host VM 108).

Flowchart 100 begins with the configuration being defined. For example, at multus-CR 102, one or more multiple NIC CNI types may be defined (e.g., defined by a user). This includes definitions for the master NetAddress list, the identified subnet, nodeBlock, interfaceBlock, and the like. From here controller 110 observes multus-CR 102 as/until these configurations are all defined across the network.

Once these configuration variables are defined, CNI controller 110 gathers interface information from CNI daemon 118. For example, first controller 110 queries CNI daemon about the interfaces, in response to which CNI daemon 118 determines a list of all available interfaces and sends this list back to CNI controller 110. Controller 110 stores this list in one of the new custom resources, where in FIG. 1 this is host interface data 112.

At this point CNI controller 110 computes CIDR. For example, CNI controller 110 may receive as an input the subnet, startIP, nodeIndex, interfaceIndex, nodeBlock, interfaceBlock, or the like. From these, controller 110 outputs a unique ordered CIDR for all pods, hosts, and interfaces, along with a CIDR for IPvlan. For example, controller 110 may receive the following inputs: subnet=172.16.0.0/12, startIP=172.22.0.1, nodeBlock=10, interfaceBlock=3, nodeIndex=1, interfaceIndex=1. Controller 110 may use these inputs to determine the following:

| mask | ff | <0000> | <0000 0000> | <0000 0000> |
| --- | --- | --- | --- | --- |
| pod CIDR subnet | 172 | 24 | 0 | 0 |
| pod CIDR mask | ff | f<1110> | <0000 0000> | <0000 0000> |
| IPvlan subnet | 172 | 24 | 0 | 0 |
| IPvlan mask | ff | f<11111> | <1111 1111> | <1000 0000> |

With all of this, controller 110 may calculate a result of the pod CIDR being 172.24.0.0/15, IPvlan CIDR=172.240.128/25. Once fully computed, controller 110 may store the determined CIDR in another of the new custom resources, CIDR computation data 114.

Following this, controller 110 configures all routes of the network. This includes sending route modification instructions (e.g., addroute, deleteroute) to CNI daemon 118, which therein accordingly executes each of these operations as sent from CNI controller 110.

Subsequently the annotated pod is created. For example, this includes attaching the annotation definitions (net-attach-def) to this pod at pod annotation 104. Multus 106 observes this to identify when the creation of the annotated pod is successfully completed. Once completed, multus 106 causes CNI binary 120 to be called by the CNI framework. CNI binary 120 then sends a request to CNI controller 110 to trigger IP allocation (e.g., where this request includes MultiNicNetwork, and/or NodeName). For example, MultiNicNetwork may include a defined watcher that creates a resource called NetAttachDefWatcher (e.g., which itself watches for network annotation definitions, as the resource name suggests) as it delegates CNI plugin details via single root input/output virtualization (SR-IOV) Network custom resources (CRs) for SR-IOV CNI to enable cluster-wide network definition.

Once CNI controller 110 receives this request, controller 110 may allocate all IP addresses using all of the information that it has gathered, and then record these allocations in IP assignment data 116. Once allocated, controller 110 sends back this compiled information (e.g., interfaceName, IP addresses from valid CIDRs, etc.), in response to which CNI binary 120 may, e.g., create IPvlan with these assigned IP addresses.

In this way, the system of FIG. 1 can be defined with NetworkAttachmentDefinition for dynamic and automatic configuration of interfaces. However, in other examples, aspects of this disclosure relate to a stand-alone system. For example, a stand-alone solution can be achieved by defining a static configuration at relevant hosts, similar to other CNI plugin.

Figure 2:
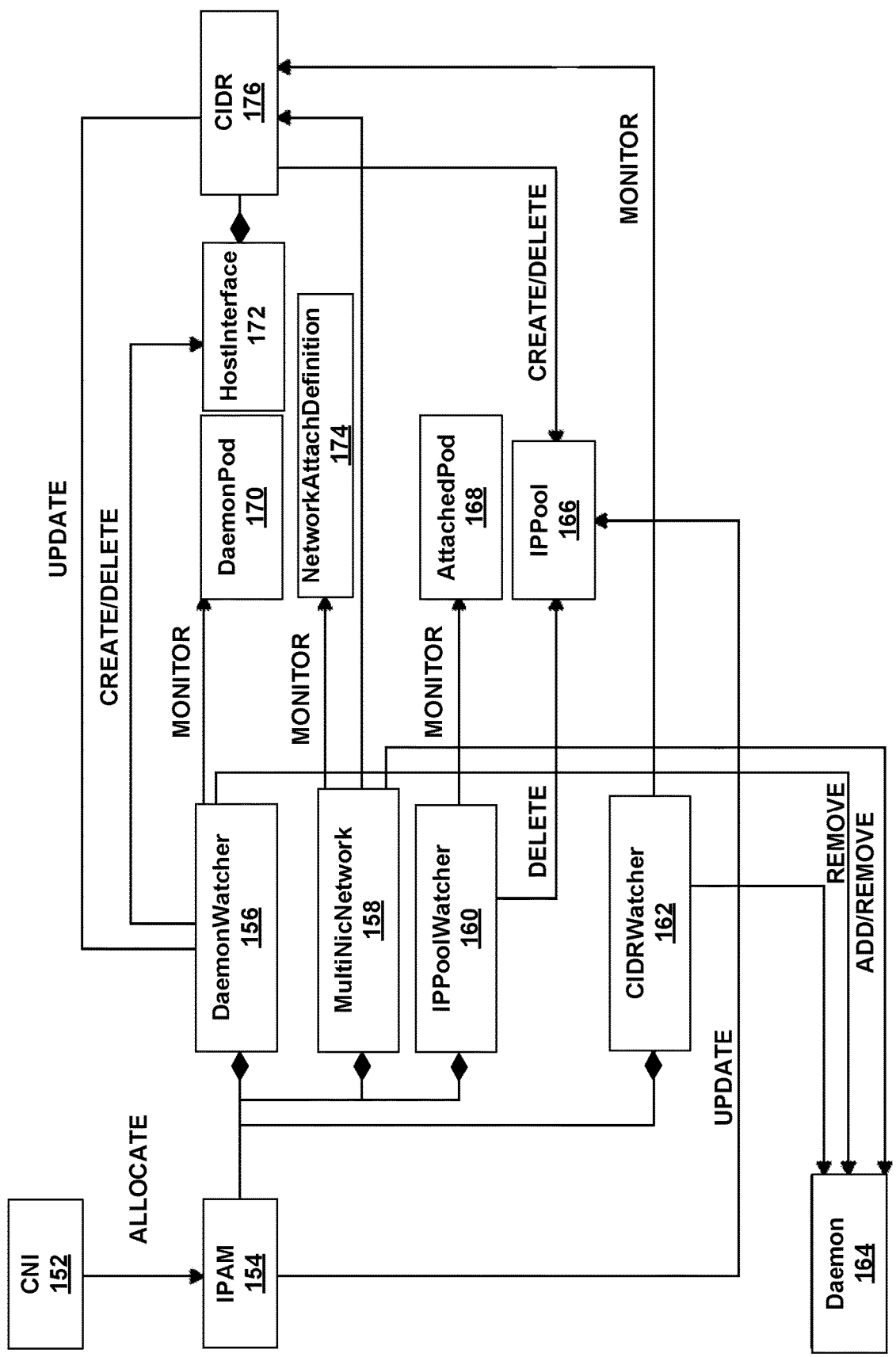
FIG. 2. depicts an example flowchart of enabling network plugin for multiple network interfaces with automated L3 configuration.

FIG. 2 provides another flowchart as to how different components interact across different steps. For example, CNI 152 allocates (IP addresses) to IPAM 154. IPAM 154 then sends the new IP addresses to numerous resources/components (Daemonwatcher 156, MultiNicNetwork 158, IPPoolWatcher 160, CIDRWatcher 162), and updates IP addresses within IPPool 166. From here numerous of these monitor other elements (e.g., to verify if/when things occur, and react accordingly). For example, DaemonWatcher 156 monitors DaemonPod 170, updates CIDR 176, removes data from Daemon 164, and creates and deletes interface and host information from HostInterface 172 as necessary. Similarly, MultiNicNetwork 158 monitors NetworkAttachDefinition 174, and then adds or removes data from Daemon 164 as necessary. Similarly, IPPoolWatcher monitors AttachedPod 168, and then deletes IP addresses from IPPool 166 as necessary. As used herein, resources should be understood to perform the plain meaning of their names when these resources are not otherwise widely known in the industry or defined herein—for example, the resource IPPoolWatcher should be understood to be a resource that monitors/watches the a "pool" of IP addresses as described herein.

Figure 3:
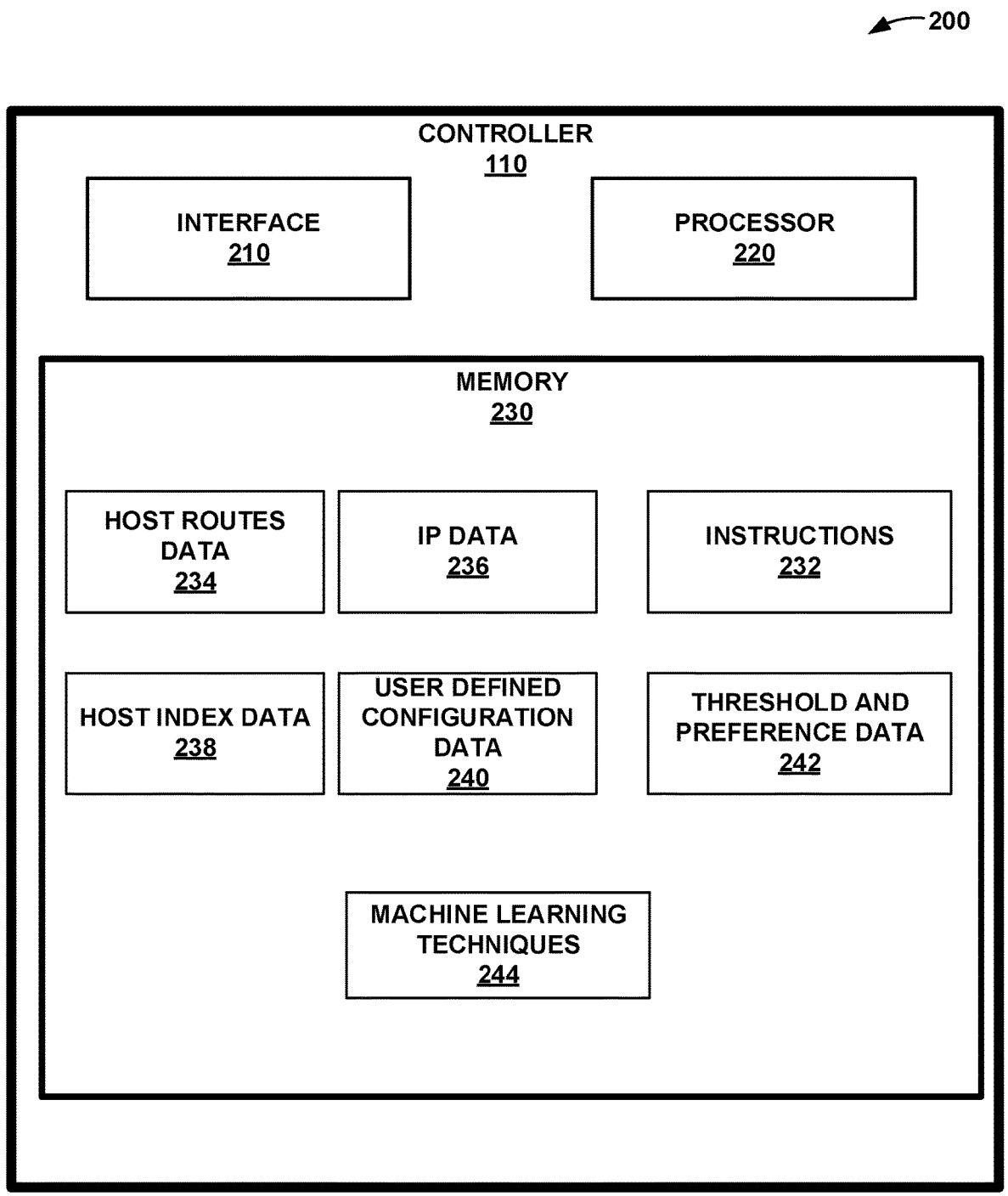
FIG. 3 depicts a conceptual box diagram of example components of a controller that may enable the network plugin for multiple network interfaces with automated L3 configuration as depicted in FIG. 2.

As described above, some of the functionality described herein may include or be part of a computing device that includes a processor configured to execute instructions stored on a memory to execute the techniques described herein. For example, FIG. 3 is a conceptual box diagram of such computing system 200, where for purposes of example FIG. 3 is provided as if controller 110 of FIG. 1 were a full system with discrete memory, processors, and interfaces as described herein. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to automate the dynamic recognition and management of hosts and interfaces on a network. Controller 110 may utilize processor 220 in this way. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together as described herein accordingly.

Processor 220 may provide a network plugin for multiple network interfaces with automated L3 configuration according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may provide a network plugin as described herein according to instructions 232 of one or more applications (e.g., software applications) stored in memory 230 of controller 110.

In addition to instructions 232, in some examples gathered or predetermined data or techniques or the like as used by processor 220 to provide a network plugin for multiple network interfaces with automated L3 configuration as described herein may be stored within memory 230. For example, memory 230 may include information described above that is gathered from environment 100. Specifically, as depicted in FIG. 2, memory 230 may include hot routes data 234, IP data 236, host index data 238, and user defined configuration data 240.

Further, memory 230 may include threshold and preference data 242. Threshold and preference data 242 may include thresholds that define a manner in which controller 110 is to provide a network plugin for multiple network interfaces with automated L3 configuration.

Memory 230 may further include machine learning techniques 244 that controller 110 may use to improve a process of providing a network plugin for multiple network interfaces with automated L3 configuration as described herein over time. Machine learning techniques 244 can comprise algorithms or models that are generated by performing supervised, unsupervised, or semi-supervised training on a dataset, and subsequently applying the generated algorithm or model to manage network host and interface routing. Using these machine learning techniques 244, controller 110 may improve an ability of generating providing a network plugin for multiple network interfaces with automated L3 configuration.

Machine learning techniques 244 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   detecting a new host being added to a network cluster, wherein each of a plurality of hosts are on the network cluster;
   detecting available interfaces on each of the plurality of hosts on the network cluster responsive to detecting the new host being added;
   calculating, using the available interfaces, classless inter-domain routing (CIDR) range for hosts and interfaces on the network cluster;
   setting pod routes with interface range and L3 host routes for each host;
   using network address to identify a subnet of the plurality of hosts;
   setting a subnet index for the subnet;
   defining a container network interface (CNI) plugin for the subnet index, wherein the CIDR range is calculated using the defined plugin;
   detecting a call for the CNI plugin at pod creation, and responsive to the call:
      automatically creating internet protocol (IP) exposing interfaces to identify available IP addresses; and
      assign the available IPs for each interface from the computed CIDR range of corresponding hosts;
   detecting that the pod is deleted; and
   recycling IP addresses in response to the pod being deleted.

2. The computer-implemented method of claim 1, further comprising:
   detecting that a host is removed from the network cluster; and
   recycling a host index in response to the host being removed.

3. A system comprising:
   a processor; and
   a memory in communication with the processor, the memory containing instructions that, when executed by the processor, cause the processor to:
      detect a new host being added to a network cluster, wherein each of a plurality of hosts are on the network cluster;
      detect available interfaces on each of the plurality of hosts on the network cluster responsive to detecting the new host being added;
      calculate, using the available interfaces, classless inter-domain routing (CIDR) range for hosts and interfaces on the network cluster;
      set pod routes with interface range and L3 host routes for each host;
      use network address to identify a subnet of the plurality of hosts;
      set a subnet index for the subnet;
      define a container network interface (CNI) plugin for the subnet index, wherein the CIDR range is calculated using the defined plugin;
      detect a call for the CNI plugin at pod creation, and responsive to the call:
         automatically create internet protocol (IP) exposing interfaces to identify available IP addresses; and
         assign the available IPs for each interface from the computed CIDR range of corresponding hosts;
      detect that a host is removed from the network cluster; and
      recycle a host index in response to the host being removed.

4. The system of claim 3, the memory containing additional instructions that, when executed by the processor, cause the processor to:
   detect that the pod is deleted; and
   recycle IP addresses in response to the pod being deleted.

5. A computer program product, the computer program product comprising a computer readable storage medium having program instructions embodied therewith, the program instructions executable by a computer to cause the computer to:
   detect a new host being added to a network cluster, wherein each of a plurality of hosts are on the network cluster;
   detect available interfaces on each of the plurality of hosts on the network cluster responsive to detecting the new host being added;
   calculate, using the available interfaces, classless inter-domain routing (CIDR) range for hosts and interfaces on the network cluster;
   set pod routes with interface range and L3 host routes for each host;
   use network address to identify a subnet of the plurality of hosts;
   set a subnet index for the subnet;
   detect that the pod is deleted;
   recycle IP addresses in response to the pod being deleted;
   detect that a host is removed from the network cluster; and
   recycle a host index in response to the host being removed.

6. The computer program product of claim 5, the computer readable storage medium having additional program instructions embodied therewith, the program instructions executable by the computer to further cause the computer to define a container network interface (CNI) plugin for the subnet index, wherein the CIDR range is calculated using the defined plugin.

7. The computer program product of claim 6, the computer readable storage medium having additional program instructions embodied therewith, the program instructions executable by the computer to further cause the computer to:
   detect a call for the CNI plugin at pod creation, and responsive to the call:
      automatically create internet protocol (IP) exposing interfaces to identify available IP addresses; and
      assign the available IPs for each interface from the computed CIDR range of corresponding hosts.

* * * * *